(12) United States Patent
Han

(10) Patent No.: US 8,646,494 B2
(45) Date of Patent: Feb. 11, 2014

(54) APPARATUS AND METHOD FOR RAPIDLY ADJUSTABLE LIQUID BLENDING RATIO

(75) Inventor: Leon Han, San Jose, CA (US)

(73) Assignee: Chemflow Systems, Inc., San Jose, CA (US)

(*) Notice: Subject to any disclaimer, the term of this patent is extended or adjusted under 35 U.S.C. 154(b) by 837 days.

(21) Appl. No.: 12/639,947

(22) Filed: Dec. 16, 2009

(65) Prior Publication Data

US 2011/0108153 A1 May 12, 2011

Related U.S. Application Data

(60) Provisional application No. 61/280,774, filed on Nov. 9, 2009.

(51) Int. Cl.
*B65B 1/30* (2006.01)
*B65B 31/00* (2006.01)
*B65B 31/04* (2006.01)
*B65B 1/08* (2006.01)
*B65B 3/08* (2006.01)

(52) U.S. Cl.
USPC ............ 141/95; 141/65; 141/67; 141/230; 141/323; 222/29; 222/47; 222/49; 222/50

(58) Field of Classification Search
USPC ......... 141/65, 67, 95, 230, 323; 222/29, 45, 222/47, 49, 50, 74, 398, 405, 464.3, 526
See application file for complete search history.

(56) References Cited

U.S. PATENT DOCUMENTS

| | | | | |
|---|---|---|---|---|
| 401,413 | A * | 4/1889 | Clark | 222/49 |
| 733,937 | A * | 7/1903 | Barrett | 222/45 |
| 1,065,852 | A * | 6/1913 | Symmes | 422/225 |
| 1,240,532 | A * | 9/1917 | Barrow et al. | 137/152 |
| 1,296,351 | A * | 3/1919 | Allen | 222/28 |
| 1,632,289 | A * | 6/1927 | Henwood | 222/44 |
| 1,772,297 | A * | 8/1930 | Venable | 222/21 |
| 3,006,505 | A * | 10/1961 | Levin | 222/26 |
| 3,602,607 | A * | 8/1971 | Hodges | 417/148 |
| 4,187,957 | A * | 2/1980 | Butler | 222/1 |
| 4,285,445 | A * | 8/1981 | Vander Molen et al. | 222/49 |
| 4,386,637 | A * | 6/1983 | Buchanan et al. | 141/65 |
| 4,509,863 | A * | 4/1985 | Borrow | 366/152.1 |
| 4,964,784 | A * | 10/1990 | Vanderheyden | 417/86 |
| 7,290,446 | B2 * | 11/2007 | Bingul et al. | 73/427 |

* cited by examiner

*Primary Examiner* — Timothy L Maust
*Assistant Examiner* — Brandon J Warner
(74) *Attorney, Agent, or Firm* — Joe Zheng; Wuxi SinoIP Agency, Ltd.

(57) ABSTRACT

A liquid dispensing and blending technique is disclosed. The apparatus includes a cover assembly unit including a mounting rack with a plurality of level indicators, a measuring vessel, for storing a liquid for dispensing, including an opening at top to be covered with the cover assembly unit, and an overflow port on a sidewall to drain an excess amount of the liquid so that a liquid surface in the measuring vessel is defined; and a dip tube attached to the mounting rack having an intake opening to remove a specific amount of the liquid from the measuring vessel, an exit end to lead the amount of the liquid to a mixing container, wherein the specific amount of the liquid is determined from the level indicators.

10 Claims, 2 Drawing Sheets

APPARATUS AND METHOD FOR RAPIDLY ADJUSTABLE LIQUID BLENDING RATIO

CROSS-REFERENCE TO RELATED APPLICATION

This application claims the benefits of U.S. Provisional Application No. 61/280,774, filed Nov. 9, 2009, and entitled "Apparatus and method for rapidly adjustable liquid blending ratio", which is hereby incorporated by reference for all purposes.

BACKGROUND OF THE INVENTION

1. Field of the Invention

The invention is generally related to the area of liquid mixing. In particular, the invention is related to liquid dispensing and blending.

2. The Background of Related Art

Mixing different proportions of liquid ingredients together is a very common manufacturing process. From a simple process of altering liquid concentration to some complex processes of producing chemical compounds, a liquid-blending process is sometimes essential and necessary. A product that requires blending of liquids usually requires a recipe specifying the ratios among the liquid ingredients in the mixture.

To blend several liquids into a mixture with desired ratios among several ingredients, the quantity of each ingredient needs to be measured, either by weight or by volume. One of the most common weighting methods for dispensing a specific volume of liquid is by gravimetric measurement. This involves dispensing the liquid into a container on a scale until a desired weight is reached. When mixing liquids based on their volumes, a common practice is to measure the volume of each liquid using metering pumps, flow meters, or scaled containers. In a normal blending process, each liquid ingredient requires a measurement before being blended into a mixture of a desired recipe. The measurements involve calibrations of the measuring equipment and the reading meters.

In a dynamic manufacturing environment, recipes of blending different liquid ingredients are often required to change to accommodate any process changes that may be required. Accordingly, the ratios among mixing ingredients in a liquid-blending process need to be adjusted from time to time. This kind of adjustment, involving resetting the equipment and re-measuring each ingredient to the desired quantities, is labor intensive and prone to errors in a manufacturing process.

The present invention discloses a technique for making quick and reliable adjustment of the ratios among all ingredients in a liquid-blending process without the need to calibrate the equipment or special attentions from operators.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

Broadly speaking, the present invention is related to techniques for liquid dispensing and blending. According to one aspect of the present invention, a liquid dispensing apparatus includes a cover assembly unit including a mounting rack with a plurality of level indicators, a measuring vessel, for storing a liquid for dispensing, including an opening at top to be covered with the cover assembly unit, and an overflow port on a sidewall to drain an excess amount of the liquid so that a liquid surface in the measuring vessel is defined; and a dip tube attached to the mounting rack having an intake opening to remove a specific amount of the liquid from the measuring vessel, an exit end to lead the amount of the liquid to a mixing container, wherein the specific amount of the liquid is determined from the level indicators.

When blending several liquids according to a specific blending ratio, several such liquid dispensing apparatuses are used. The blending ratio of each liquid ingredient in the liquid mixture is the ratio of the inserted depth of the dip tube below the liquid surface as indicated by the level indicators on the mounting rack in each of the apparatuses. The procedure to change the blending ratio of a liquid mixture is therefore simply by adjusting the setting of the dip tube position in each of the apparatuses to a new desired level.

The present invention may be implemented as a method, an apparatus or a part of a system. According to one embodiment, the present invention is an apparatus for dispensing liquid for blending, the apparatus comprising: a top cover with an opening for inserting a tube; a mounting rack attached to the top cover and having a set of level indicators, wherein a first level indicator of the set is at a highest position close to the top of the mounting rack relative to other level indicators in the set; a measuring vessel to store a liquid for dispensing having a constant horizontal cross-sectional areas inside its walls, an opening at top to receive the top cover with the mounting rack, and an overflow port on a sidewall, wherein the overflow port allows excess liquid to flow out of the vessel and maintains a fully charged liquid free surface at a constant location; and a dip tube attached to the mounting rack having an intake end to remove a liquid from the measuring vessel, an exit end to be connected to a liquid moving device, (e.g., a suction pump) and a position marker on its surface, wherein the length of the dip tube between the position marker and the intake end is substantially equivalent to the distance between the first level indicator on the mounting rack and the fully charged liquid free surface in the measuring vessel.

According to one embodiment, the present invention is a method for dispensing liquids for blending in desired ratios, the method comprises: providing a plurality of liquid dispensing apparatuses; filling a measuring vessel including an overflow port in each of the liquid dispensing apparatuses with a liquid until an excess amount of the liquid overflows from the overflow port to form a liquid surface; attaching a dip tube to a mounting rack in each of the liquid dispensing apparatus; positioning the dip tube in each of the liquid dispensing apparatuses according to the desired blending ratio by aligning a position mark on the dip tube to a level indicator on the mounting rack; and transporting the liquid from the dip tube of each of the liquid dispensing apparatuses to a collecting container.

The present invention includes many objects, features, and advantages that will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 1:
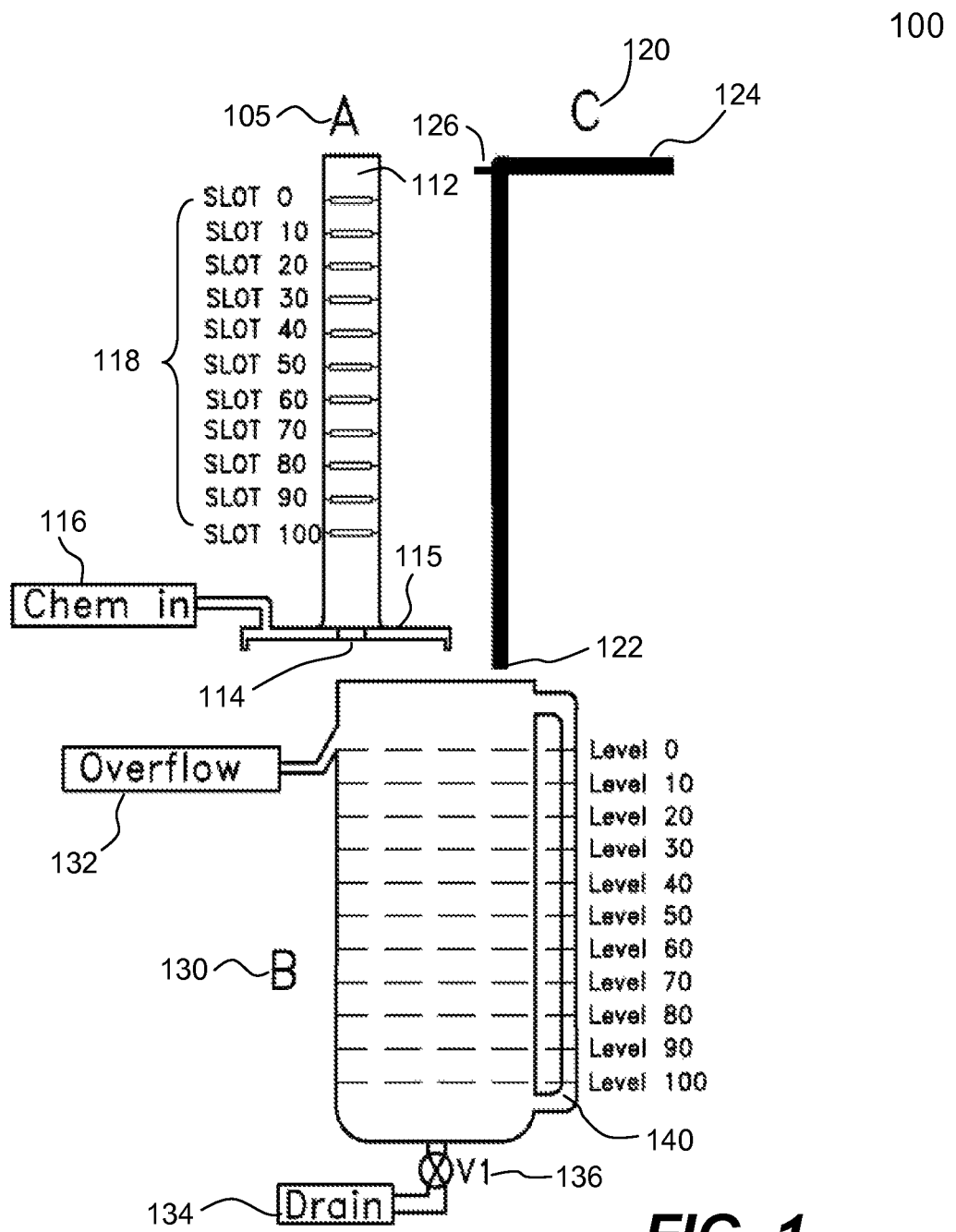
FIG. 1 shows an exemplary embodiment of three key components of an adjustable liquid dispensing apparatus.
Figure 2:
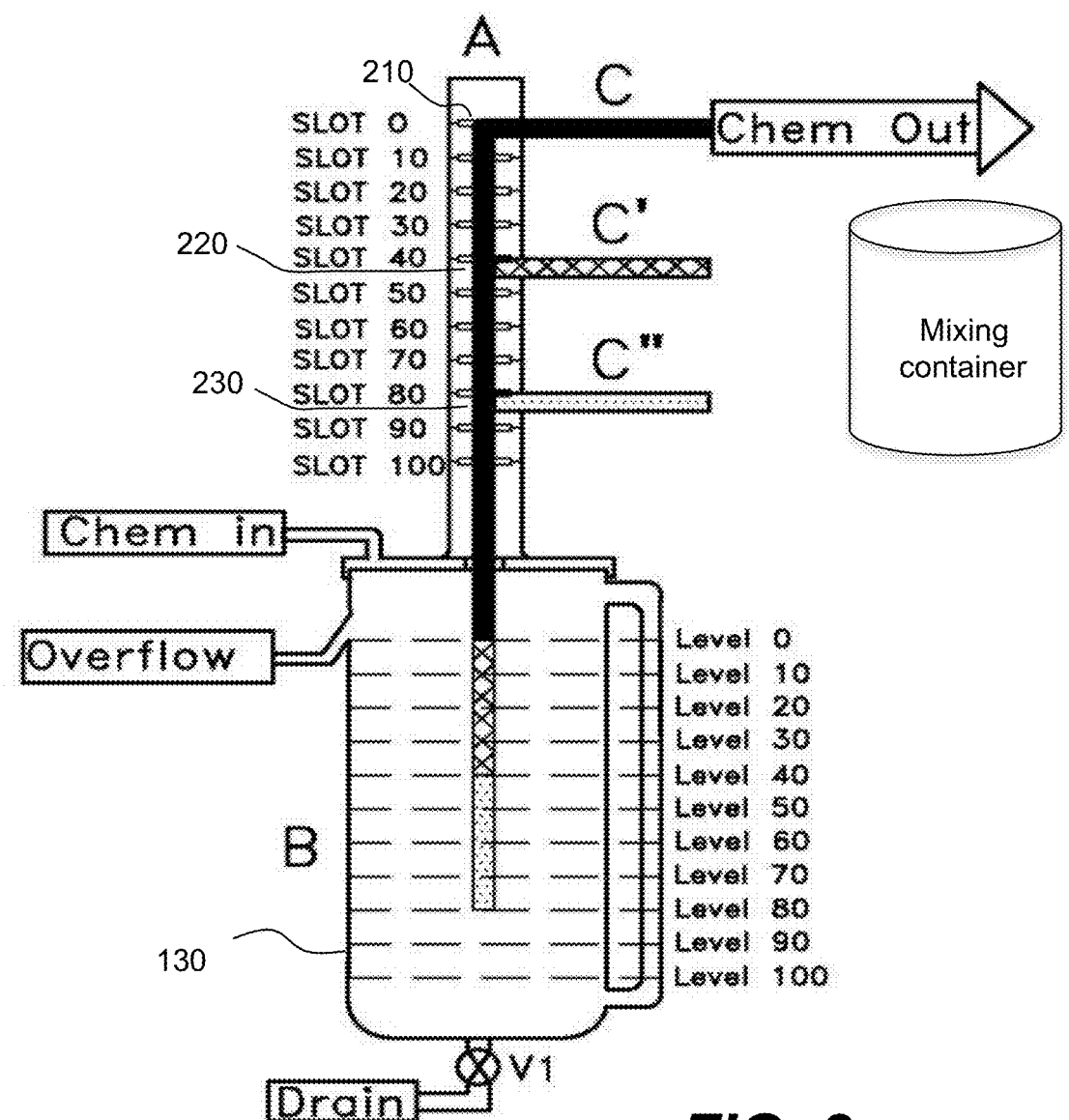
FIG. 2 shows an exemplary embodiment of an assembled adjustable liquid dispensing apparatus with three illustrated dip tube positions for dispensing three different amounts of liquid.

Embodiments of the present invention are discussed herein with reference to FIGS. 1 and 2. However, those skilled in the art will readily appreciate that the detailed description given herein with respect to these figures is for explanatory purposes as the invention extends beyond these limited embodiments.

FIG. 1 shows the three main components of an adjustable liquid dispensing apparatus 100 that includes the cover assembly unit 105, a dip tube 120, and a measuring vessel 130. The cover assembly unit 105 includes a mounting rack 112 with a set of level indicators 118 and a cover 115 with an opening 114, where the opening 114 leads to the mounting rack 112 for accommodating the dip tube 120. From an appropriate distance to the top of the mounting rack 112, a first level indicator is marked with index 0, e.g., slot-0. In one embodiment, ten equally spaced level indicators 118 are marked sequentially following the slot-0 mark from top down along the mounting rack 112. The level indicators 118 are indexed in an increment of 10 with the last one being slot-100 at the lowest position of the mounting rack 112.

It should be noted that the level indicators 118 shown in FIG. 1 are for illustration only. As will be further detailed below, each indicator corresponds to a measurement. A beginning level indicator slot-0 and subsequent 10 level indicators represent 10 equal measurements. Those skilled in the art can readily appreciate various indicators may be used to represent a measurement, for example, a percentile, a weight, a density, a color, a temperature or a volume.

The opening 114 allows the dip tube 120 to attach to the mounting rack 112 with an intake opening 122 of the dip tube 120 inserted through the opening 114 into the measuring vessel 130. The mounting rack 112 also serves as a guide for the dip tube 120 to slide up and down and be fastened at any level indicator positioned along the mounting rack 112. Means of attaching the dip tube 120 to the mounting rack 112 are not in the scope of this invention. These means are well known to those skilled in the art and will not be described here. In one embodiment, an inlet port 116 is provided to feed a liquid into the measuring vessel 130 when the cover assembly unit 105 is used to cover the measuring vessel 130.

The measuring vessel 130 is a container (e.g., cylindrical type) to be covered with the cover assembly unit 105. An overflow port 132 is located on the sidewall of the measuring vessel 130. As the measuring vessel 130 is being filled with a liquid, the overflow port 132 allows the excess liquid to flow out of the measuring vessel 130, and keeps the liquid free surface leveled with the lowest position of the opening of the overflow port 132. Therefore, no special attention from an operator, such as reading a scale, is required when fully charging the measuring vessel 130 with a liquid. The measuring vessel 130 has a constant horizontal cross-sectional area inside its walls from the location of the overflow port 132 to where the intake opening 122 of dip tube 120 can reach. A drain port 134 controlled by a valve 136 is located at the bottom of the measuring vessel 130 for discharging the liquid. In one embodiment, an inlet port may be opened on the measuring vessel 130 instead of on the cover assembly unit 105.

The dip tube 120 has an intake opening 122 to be inserted into the measuring vessel 130 and a liquid exit end 124 to be connected to any liquid transport devices (e.g., a suction pump) to move liquid from the measuring vessel 130. A marking 126 is placed on the dip tube 120 to facilitate positioning the dip tube 120 and aligning it with a desired level indicator 118 on the mounting rack 112. The length of the dip tube 120 from the marking 126 to its intake opening 122 is equal to the distance between the first level indicator, i.e., slot-0 on the mounting rack 112 and the liquid surface in a fully charged measuring vessel 130. One preferred embodiment of the dip tube 120 with a 90-degree bent and a marking 126 at the bent corner is shown in FIGS. 1 and 2, respectively. It should be noted that the shape and the size of the dip tube 120 does not affect the functionality of the invention and should not limit the scope of the present invention.

In another embodiment, soft-stop elements may be used on each of the level indicator in the mounting rack 112 and the dip tube marking 126 to provide secured and firmed stop positions for easy positioning the dip tube 120 at a desired level position. For example, shallow indentations may be provided at each level indicator position on the mounting rack 112 to accept a partially protruded spring-loaded ball installed on the dip tube marking 126. Other types of securing means may also be used for the same purpose.

FIG. 2 shows one embodiment of a fully assembled basic unit of an adjustable liquid dispensing apparatus with three illustrated dip tube 120 positions. Referring to FIG. 2, there is a liquid dispensing apparatus unit with the measuring vessel 130 fully charged with a type of liquid. At position 210, the dip tube 120 is positioned with its marking 126 aligned with slot-0 on the mounting rack 112, corresponding to the intake opening 122 at level 0. In this case, the intake opening 122 of the dip tube 120 is right at the liquid free surface. No liquid can be transported through the dip tube 120 because the intake opening 122 does not contact the liquid. At position 220, the dip tube 120 is positioned with its marking 126 aligned with slot-40 on the mounting rack 112, corresponding to the intake opening 122 at level 40. The intake opening 122 is now below the liquid surface with a depth equivalent to the distance between slot-0 and slot-40 on the mounting rack 112. As the liquid exit end 124 is connected to a low-pressure source, for example, a suction pump, a volume of liquid equal to the volume above the intake opening 122 in the measuring vessel 130 will be dispensed for blending. The transporting of the liquid is automatically stopped when the liquid free surface falls below the intake opening 122. Similarly, at position 230, the dip tube 120 is set to transport an amount of liquid equivalent to a depth from slot-0 to slot-80 mounting rack 112, corresponding to the intake opening 122 at level 80. The mechanisms and methods for transporting the liquid through the dip tube 120 are known to those skilled in the art and will not be described herein to obstruct aspects of the invention.

Because the measuring vessel 130 has a constant cross-sectional area inside its walls in the volume where liquid is being removed, the level indicators on the mounting rack 112 may represent the volume of liquid being dispensed. When multiple identical liquid dispensing apparatuses are used to dispense multiple liquids for blending, the ratio of each liquid in the resultant mixture can be deduced from the ratio of each level indicator settings in each apparatus.

The following examples are intended for facilitating the understanding of the invention, and should not be treated as limitations to the scope of the present invention.

For example, a liquid mixture is to be produced by blending three liquids in a ratio of 30% A, 20% B and 50% C. Three basic liquid dispensing apparatuses are used. A measuring vessel in each apparatus, as contemplated according to one embodiment of the invention, is fully charged with one liquid ingredient A, B or C. A dip tube is positioned with its marking setting at slot-30, slot-20 and slot-50 for the apparatus containing A, B and C respectively. As all three liquids are transported to a collecting container, the blending ratio among the three liquids in the liquid mixture is 30:20:50, that is, the ratio of their respective level indicator settings.

When blending liquids with ratios not in multiple of 10%, the setting of each dip tube may be deduced by dividing the level setting of each liquid ingredient by the sum of the level settings of all liquid ingredients. For example, to produce a mixture of 12.5% A, 62.5% B and 25% C, one can set the dip tube at slot-10, slot-50 and slot-20 for the apparatuses containing liquids A, B and C respectively. The total volume of the final mixture is 10+50+20=80 (arbitrary unit). Therefore, the ratio of A is equal to 10/80=12.5%. Ratios of B and C can be deduced in a similar way to be 62.5% and 25% respectively.

Alternatively, an operator may use only one dispensing apparatus containing one of the liquids to be blended (e.g., A) with the dip tube setting at the desired level indicator slot and dispense the liquid to a collecting container. Then repeat the processes for each of the liquid ingredients until all the ingredients are transported.

When blending liquid with ratio specified by weight instead of by volume, the dip tube 120 may be set according to the ratio between the specific weights of the ingredients. For example, to blend two liquids into a mixture of 50% A and 50% B by weight, if the specific weight of A is one half of that of B, one may set the dip tube at slot-100 for A and at slot-50 for B. With twice the volume, liquid A now has the same weight as liquid B.

Depending on size of the measuring vessel 130 used, the volume of the final blended mixture may vary. However, the ratio among the blended ingredients in the mixture remains constant as long as the dip tube settings for each ingredient stay the same.

When it is required to change the blending ratio among the liquid ingredients, a user may simply reposition the dip tube 120 in each liquid dispensing apparatus to their respective new desired levels, refill the measuring vessel 130 until it overflows, i.e., fully charged, and starts pumping out each liquid to a collecting container. The operation is simple and straightforward. No measurements or calibrations of equipment are required.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. Accordingly, the scope of the present invention is defined by the appended claims rather than the forgoing description of embodiments.

What I claim is:

1. An apparatus for dispensing liquids for blending according to a desired ratio, the apparatus comprising:
   a mounting rack;
   a cover assembly unit with the mounting rack disposed on one side thereof and extended above the cover assembly to accommodate a dip tube therein,
   the mounting rack having a plurality of level indicators to allow the dip tube to be removably aligned at one of the level indicators; and
   a measuring vessel, for storing a liquid for dispensing, including an opening at a top thereof to be covered with the cover assembly unit, an overflow port on a sidewall to drain an excess amount of the liquid so that a liquid surface in the measuring vessel is defined, and a side tube to show the liquid surface,
   wherein the side tube shows a plurality of level indicators directly correlating with the level indicators of the mounting rack for an operator to monitor the liquid surface inside the measuring vessel,
   wherein the dip tube, removably accommodated in the mounting rack, has an intake opening to remove a specific amount of the liquid from the measuring vessel, and an exit end to lead the amount of the liquid to a mixing container,
   the dip tube operating to extend into the liquid to a depth defined by a distance between the liquid surface and one of the level indicators of the side tube, the distance being controlled by aligning the dip tube at a correlating one of the level indicators of the mounting rack, and drawing the specific amount of the liquid between the liquid surface in the measuring vessel and the intake opening of the dip tube.

2. The apparatus as recited in claim 1, wherein the dip tube is removably aligned to any of the level indicators on the mounting rack according to the desired ratio.

3. The apparatus as recited in claim 2, wherein the dip tube draws nothing from the measuring vessel when the dip tube is secured to the mounting rack at the beginning level indicator.

4. The apparatus as recited in claim 3, wherein the intake opening of the dip tube is just above the liquid surface when the dip tube is set to a beginning level indicator.

5. The apparatus as recited in claim 1, wherein the dip tube further includes a beginning level indicator, each of the level indicators to the beginning level indicator indicates how much of the liquid to be drawn from the measuring vessel by the dip tube.

6. The apparatus as recited in claim 5, wherein the cover assembly unit further includes an inlet port to feed the liquid into the measuring vessel when the cover assembly unit is used to cover the measuring vessel.

7. The apparatus as recited in claim 6, wherein the measuring vessel further comprises an inlet port to feed the liquid into the measuring vessel.

8. The apparatus as recited in claim 1, wherein the measuring vessel further comprises a discharge port connected by a valve at a bottom of the measuring vessel.

9. The apparatus as recited in claim 1, wherein the dip tube is adjustable with reference to the mounting rack to specify a desired amount of the liquid to be taken out from the measuring vessel.

10. The apparatus as recited in claim 1, wherein the mounting rack allows the dip tube to slide in or out.

* * * * *